United States Patent [19]

Kitagawa et al.

[11] Patent Number: 4,966,928

[45] Date of Patent: Oct. 30, 1990

[54] EPOXY RESIN BASED POWDER COATING COMPOSITION

[75] Inventors: Katugi Kitagawa, Saitama; Ichiro Akutagawa, Chiba; Kazuya Ono, Tokyo, all of Japan

[73] Assignee: Somar Corporation, Tokyo, Japan

[21] Appl. No.: 232,989

[22] Filed: Aug. 17, 1988

[51] Int. Cl.$^5$ ............................................. C08G 59/42
[52] U.S. Cl. .................................. 523/437; 523/467; 525/108; 525/119; 525/122; 525/482
[58] Field of Search ............... 525/119, 122, 482, 108; 528/112, 115, 365; 523/437, 467

[56] References Cited

U.S. PATENT DOCUMENTS

| | | | |
|---|---|---|---|
| 3,271,476 | 9/1966 | Widmer et al. | 528/365 X |
| 3,288,761 | 11/1966 | Nikles et al. | 528/365 |
| 3,324,198 | 6/1967 | Gruver | 528/365 |
| 3,386,924 | 6/1968 | Steden et al. | 528/365 X |
| 3,598,749 | 8/1971 | Cheng et al. | 528/112 X |

*Primary Examiner*—Earl Nielsen
*Attorney, Agent, or Firm*—Sughrue, Mion, Zinn, Macpeak & Seas

[57] ABSTRACT

An epoxy resin based powder coating composition is disclosed, comprising an epoxy resin, a reaction product of dicyclopentadiene and maleic anhydride, and a cure accelerator.

The coating composition may further comprise an aromatic acid anhydride based curing agent, an impact modifier and a surface smoothing agent.

The coating composition has stable powder characteristic and provides good heat resistance and electrical insulation.

6 Claims, No Drawings

EPOXY RESIN BASED POWDER COATING COMPOSITION

FIELD OF THE INVENTION

The present invention relates to an epoxy resin composition that has stable powder characteristics and which cures to provide good heat resistance and electrical insulation. The cured product is useful as a molding material or a sealing material, and is particularly useful for impregnation or secure installation of various coils by employing powder coating techniques.

BACKGROUND OF THE INVENTION

Epoxy resins are conventionally cured with amine-based curing agents and common examples are aliphatic or aromatic polyamines, as well as secondary or tertiary amines. However, from the viewpoint of environmental hygienics, amine-based hardeners are not highly recommendable since they have strong irritating effects on the skin.

Under these circumstances, attention has been drawn to acid anhydride based curing agents such as maleic anhydride, phthalic anhydride and hexahydrophthalic anhydride and the use of them has increased these days.

However, such acid anhydride based curing agents have various problems, among which the following are pronounced: (1) absorbency is high; (2) high temperatures are needed to effect curing; (3) prolonged cure times are necessary; (4) solid and low-melting acid anhydrides may sometimes sublime when curing is effected at high temperatures; and (5) solid and high-melting acid anhydrides do not have satisfactory miscibility with epoxy resins.

SUMMARY OF THE INVENTION

An object, therefore, of the present invention is to provide a novel and improved epoxy resin composition that successfully solved the aforementioned problems of the prior art.

The present inventors conducted intensive studies on powdered epoxy resin compositions that would show good stability during transport or storage and which would have gel times that make them suitable for use as powder materials while displaying high strength of adhesion to a variety of substrates and providing cured products having satisfactory impact and heat resistance.

As a result, the present inventors established experimentally that the intended object could be attained by a composition comprising an epoxy resin, a reaction product of dicyclopentadiene and maleic anhydride, and a cure accelerator. The present invention has been accomplished on the basis of this empirical observation.

While the composition of the present invention has the basic formulation set forth above, further improvement in its physical properties could be attained by incorporating calcium silicate and/or calcium carbonate as an inorganic filler, and an acrylonitrile-butadiene copolymer as an additional component.

DETAILED DESCRIPTION OF THE INVENTION

Epoxy resins that can be used in the present invention include aliphatic epoxy resins such as bisphenol A type solid epoxy resins, bisphenol F type epoxy resins, phenol-novolak or cresol-novolak type epoxy resins, alicyclic epoxy resins, hydrogenated bisphenol A or AD type epoxy resins, aliphatic epoxy resins such as propylene glycol diglycidyl ethers and pentaerythritol polyglycidyl ethers, epoxy resins derived from aliphatic or aromatic carboxylic acids and epichlorohydrin, glycidyl ether type epoxy resins derived from ortho-aryl phenol novolac compounds and epichlorohydrin, epoxy resins derived from aliphatic or aromatic amines and epichlorohydrin, heterocyclic epoxy resins, spiro ring-containing epoxy resins, and epoxy modified resins.

Of these epoxy resins, aliphatic epoxy resins are preferably used in the present invention.

These epoxy resins may be used either independently or in combination of two or more types. When a mixed epoxy resin is used in the present invention, one consisting of 60-90 wt % of a bisphenol A type solid epoxy resin and 10-40 wt % of a cresol-novolak type epoxy resin is especially preferred.

The reaction product of dicyclopentadiene and maleic anhydride for use in the present invention may be synthesized by subjecting dicyclopentadiene and maleic anhydride at a desired molar ratio, optionally in the presence of a reaction catalyst (e.g., tert-butyl peroxypivalate, tert-butyl peracetate, tert-butyl hydroperoxide), in solution or bulk form.

The acid value, molecular weight, the equivalent weight of acid anhydride and other factors of this reaction product are not very much critical for the purposes of the present invention.

This reaction product may be modified in several ways, such as replacing part of the hydrogen atoms with suitable atoms or groups, or condensing the reaction product.

The above-described reaction product of dicyclopentadiene and maleic anhydride may be illustrated by the following examples.

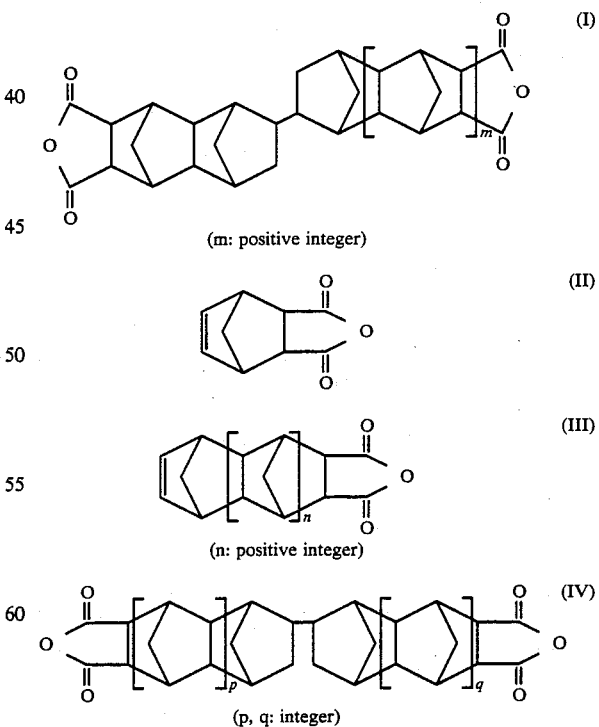

(m: positive integer)

(n: positive integer)

(p, q: integer)

Among the examples given above, the reaction product represented by formula (I) is particularly preferred for the purposes of the present invention.

The reaction product of dicyclopentadiene and maleic anhydride generally is used in an amount of 10 to 60 parts by weight, preferably 30 to 50 parts by weight, per 100 parts by weight of the epoxy resin. If the content of this reaction product is less than 10 parts by weight per 100 parts by weight of the epoxy resin, difficulty is encountered in obtaining a desired cured product. Even if it is possible to obtain a cured product, the curing will require elevated temperatures or prolonged periods. If more than 60 parts by weight of the reaction product is used, the physical properties of the composition will deteriorate or it may become uneconomical.

The cure accelerator suitable for use in the present invention may be selected from among the various compounds that have conventionally been used with epoxy resins. Specific examples include: tertiary amines such as triethy lamine, N,N-dimethylbenzy la mine, hexamethylenetetramine, and N,N-dimethylaniline; imidazole compounds; metal compounds such as zinc acetate and sodium acetate; amide compounds; acid anhydrides; peroxides; phenolic resins; azo compounds; cyanate compound; isocyanate compounds; and quaternary ammonium salts such as tetramethyl ammonium bromide. From the viewpoints of powder stability and reaction efficiency, phenolic compounds, in particular, phenol salts of diazabicycloundecene, are advantageous. Further, 2-undecyl-3-cyanoethylimidazole also is preferably used as the cure accelerator.

The cure accelerator generally is used in an amount of 0.1 to 5.0 parts by weight, preferably 0.3 to 3.0 parts by weight, per 100 parts by weight of the epoxy resin. If the amount of the cure accelerator used is less than 0.1 part by weight, curing requires either high temperatures or prolonged periods and is not commercially feasible. If the use of the cure accelerator exceeds 5.0 parts by weight, not only is the storage stability of the resulting powder material impaired but it also becomes uneconomical.

It is preferred to use an aromatic acid anhydride based curing agent in the present invention. Specific examples of this type of curing agent include: phthalic anhydride, trimellitic anhydride, pyromellitic anhydride, 3,3',4,4'-benzophenone tetracarboxylic dianhydride, ethylene glycol bis(anhydrotrimellitate), glycerol tris(anhydrotrimellitate), and 5-(2,5-dioxotetrahydrofuryl)-3-methyl-3-cyclohexene-1,2-dicarboxylic anhydride.

Among these aromatic acid anhydrides, aromatic carboxylic acid anhydrides are particularly useful in the present invention.

These curing agents are preferably used in amounts ranging from 0.5 to 1.2 times the theoretical value of the equivalent weight of the acid anhydride in this type of curing agent with respect to the epoxy equivalent weight of the epoxy resin. If this range is not complied with, the resulting cured product will not have a desired hardness and instead, it will be soft enough to easily undergo thermal deterioration (i.e., poor heat resistance).

An impact modifier and a surface smoothing agent are also preferably incorporated in the coating composition of the present invention. Typical example of the impact modifier is acrylonitrile-butadiene copolymer, and typical example of the surface smoothing agent is acrylic acid ester oligomer.

The impact modifier preferably is used in an amount of 1.0 to 3.0 parts by weight, per 100 parts by weight of the epoxy resin and the surface smoothing agent preferably is used in an amount of 0.1 to 0.5 part by weight, per 100 parts by weight of the epoxy resin.

The composition of the present invention may further incorporate optional additives, such as a reinforcing agent (e.g., butyral resin, formal resin), a filler (e.g., silica, calcium carbonate, calcium silicate), a coupling agent (e.g., $\beta$-(3,4-epoxycyclohexyl)ethyltrimethoxysilane, $\gamma$-glycidoxypropyltrimethoxysilane), a flame-retardant (e.g., hexabromobenzene, decabromodiphenylether, antimony oxide, aluminum hydroxide and a combination thereof), and a pigment and a colorant (e.g., $Fe_2O_3$, $Cr_2O_3$, $TiO_2$).

The composition of the present invention can be prepared by uniformly blending the essential components described above, as well as an optionally added additives, by known methods.

The powdered epoxy resin material prepared from the composition of the present invention will not deteriorate in its performance by absorbing moisture during storage or transport. In addition, this material has an appropriate gel time and produces good adhesion to various substrates such as coated or uncoated metals and ceramics. The cured product of this material has high heat resistance and will not deteriorate upon exposure to elevated temperatures. Besides being highly heat resistant, the cured product exhibits good electrical insulating properties.

The present invention is hereunder described in greater detail with reference to working examples and comparative examples, in which all parts are on a weight basis.

EXAMPLES 1 TO 7 AND COMPARATIVE EXAMPLES 1 TO 3

Compositions having the formulations noted in Table 1 were uniformly heated to melt in a kneader. After cooling, the compositions were ground into particles having particle size distributions of 2.0 to 10 mm in diameter and 1.0 to 3.0 mm in thickness to prepare powder material. The resulting powder materials were examined for their hygroscopicity and gel times.

The same powder materials were cured and examined for the strength of adhesion to a substrate, glass transition temperature, impact strength and thermal deterioration under elevated temperatures (heat resistance).

The above-mentioned physical properties were measured by the following methods.

Moisture Absorption:

A sample powder was left for 7 days under the circumstances of 40° C. and 80% relative humidity and checked for any increase in its weight. The criteria for evaluation were as follows: ◎, no increase in weight; ○, little increase in weight; Δ, some increase in weight; X, significant increase in weight.

Gel time:

In accordance with JIS C-2104, a sample powder weighing from about 0.1 to 0.2 g was placed in a circular concavity in a hot plate held at 150° C. or 200 ° C. and the time (in seconds) required for the powder to gel was measured. The shorter the gel time, the better.

Adhesive strength:

Two rectangular iron plates (20×100×3.2 mm) were provided. After heating at 150° C.-160° C., a powder coating was applied to one side of each iron plate over an area from one end in the longitudinal direction to about 15 mm toward the opposite end. The two iron plates were placed one on top of the other in such a way that the uncoated areas were at the far ends with the coated sides facing each other.

The two plates were left for 30 minutes at 150° C. -60° C., with the superposed areas securely held together with pinchcocks. Upon subsequent standing at room temperature, the two iron plates were bonded into a unitary assembly by virtue of the coating film in the superposed areas. The two ends of this test piece were pulled in opposite directions with a universal tensile tester to measure the adhesive strength of the coating under shear at room temperature or at 180° C.

which the dard could be dropped without causing cracks in the cured film was determined.

Heat Resistance (Resistance to Thermal Deterioration at Elevated Temperature):

A test piece was left in an oven at 400° C. -450° C. for 3 to 5 minutes. Thereafter, it was removed from the oven and visually checked for the occurrence of any abnormality such as cracking or blistering. The results were evaluated by the following criteria: ◎ , no change at all; ○ , no change; △, some cracking and blistering occurred; X, extensive cracking and blistering occurred; XX, almost carbonized.

TABLE 1

|     |     | Examples | | | | | | | Comparative Examples | | |
|-----|-----|---|---|---|---|---|---|---|---|---|---|
|     |     | 1 | 2 | 3 | 4 | 5 | 6 | 7 | 1 | 2 | 3 |
| (A) | Epoxy Resin (1) | 100 | 80 | 80 | 80 | 80 | 80 | 80 | 100 | 100 | 80 |
|     | Epoxy resin (2) | — | 20 | 20 | 20 | 20 | 20 | 20 | — | — | 20 |
| (B) | Addition polymerization product of dicyclopentadiene (5 mol) and meleic anhydride (5 mol) | 30 | 40 | 40 | 40 | 40 | 26 | 26 | — | — | — |
| (C) | Phenol salt of diazabicycloundecene | 1.5 | 1.5 | 1.5 | 1.5 | — | 1.5 | 1.5 | — | 0.5 | 0.7 |
|     | 2-Undecyl-3-cyano-ethylimidazole | — | — | — | — | 1.5 | — | — | — | — | — |
| (B') | Benzophenonetetra- | — | — | — | — | — | 7.5 | — | 21 | 21 | — |
|     | 5-(2,5-Dioxotetrahydrofuryl)-3-methyl-3-cyclohexene-1,2-dicarboxylic acid anhydride | — | — | — | — | — | — | 8.3 | — | — | 23 |
| (D) | Calcium silicate | 100 | 100 | 100 | 50 | 100 | 100 | 100 | 100 | 100 | 80 |
|     | Calcium carbonate | — | — | — | 50 | — | — | — | — | — | — |
| (E) | Acrylonitrile-butadiene copolymer | — | — | 2.0 | 2.0 | — | 2.0 | 2.0 | — | — | 2.0 |
| (F) | Acrylic acid ester oligomer | — | — | 0.2 | 0.2 | — | 0.2 | 0.2 | — | — | 0.2 |
|     | Moisture absorption | ○~◎ | ○~◎ | ◎ | ◎ | ◎ | ◎ | ◎ | △~X | X | ○ |
|     | Gel time (sec) | | | | | | | | | | |
|     | at 150° C. | 110 | 94 | 95 | 93 | 120 | 100 | 105 | 840 | 85 | 110 |
|     | at 200° C. | 28 | 18 | 20 | 18 | 30 | 22 | 23 | 130 | 20 | 23 |
|     | Adhesive strenght (kg/cm$^2$) | | | | | | | | | | |
|     | room temperature | 210 | 220 | 230 | 225 | 208 | 230 | 235 | 230 | 200 | 220 |
|     | at 180° C. | 110 | 118 | 120 | 118 | 120 | 115 | 110 | 53 | 50 | 50 |
|     | Glass transition temperature | | | | | | | | | | |
|     | 0.5 hr/160° C. | 160 | 165 | 165 | 160 | 170 | 165 | 160 | 155 | 145 | 150 |
|     | 1 hr/220° C. | 170 | 180 | 180 | 175 | 180 | 175 | 165 | 160 | 150 | 155 |
|     | Impact strength | 45 | 40 | 40 | 45 | 40 | 40 | 45 | 30 | 25 | 20 |
|     | Heat resistance | ○ | ◎ | ◎ | ○~◎ | ○~◎ | ○~◎ | ○ | X | △~X | XX |

Notes
Epoxy resin (1): Bisphenol A type solid epoxy resin (Epikote 1002 of Yuka-Shell Epoxy Co., Ltd.)
Epoxy resin (2): Cresol-novolac type epoxy resin (ECN-280 of Asahi Chemical Industry Co., Ltd.)
Reaction product dicyclopentadiene and maleic anhydride: DM-55 of Idemitsu Petro-Chemical of Co., Ltd.
Acrylonitrilebutadiene copolymer: Nipol of Nippon Zeon Co., Ltd.
Calcium silicate: SW-400 (average particle size, 5.5–8.9 μm) of K.K. Tatsumori
Calcium carbonate: KC-30 (average particle size, 6.62 μm) of Katakura Chikkarin Co., Ltd.
Acrylic acid esteroligomer: Nikalite XK-21 of Nippon Carbide Industries Co., Inc. having a viscosity of 1,300 cPs at 25° C. and a refractive index of 1.464

Heat-deflection Temperature (HDT):

A sample powder was poured into a mold (12.7×12.7×100 mm) and hot-pressed at 160° C. The shaped part was heated first at 160° C. for 0.5 hour and then at 220° C. for 1 hour to prepare a test piece. HDT measurement was conducted on this test piece in accordance with ASTM D-648.

Impact Strength:

A sample powder was applied to one side of a square iron plate (60×60×3.2 mm) to give a coating thickness of 0.3–0.4 mm in the cured state. The applied coating was heated at 150° C. for 30 minutes, then left at room temperature to produce a cured coating film.

Using a Du Pont impact strength tester (load, 1 kg; falling dart head, ½ inch), the maximum height from As is apparent from the results shown in Table 1, the epoxy resin composition samples according to the present invention have stable powder characteristics and provide good heat resistance.

While the invention has been described in detail and with reference to specific embodiments thereof, it will be apparent to one skilled in the art that various changes and modifications can be made therein without departing form the spirit and scope thereof.

What is claimed is:

1. An epoxy resin based powder coating composition comprising
   (A) 100 parts by weight of a mixed epoxy resin consisting of 60–90 wt % of a bisphenol A type solid epoxy resin and 40–10 wt % of a cresol-novolak type epoxy resin, (B) 30–50 parts by weight of the reaction product of dicyclopentadiene and maleic anhydride represented by the following general formula:

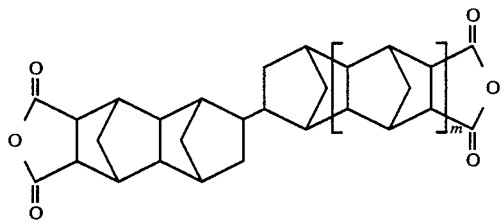

wherein m is a positive integer,
(C) 0.1–5 parts by weight of a phenol salt of diazabicycloundecene or 2-undecyl-3-cyanoethylimidazole,
(D) 80–120 parts by weight of calcium silicate,
(E) 1.0–3.0 parts by weight of an acrylonitrile-butadiene copolymer, and
(F) 0.1–0.5 parts by weight of an acrylic acid ester oligomer.

2. An epoxy resin based powder coating composition comprising
(A) 100 parts by weight of a mixed epoxy resin consisting of 60 90 wt % of a bisphenol A type solid epoxy resin and 40 to 10 wt % of a cresol-novolak type epoxy resin,
(B) 10 to 60 parts of the reaction product of dicyclopentadiene and maleic anhydride represented by the following general formula:

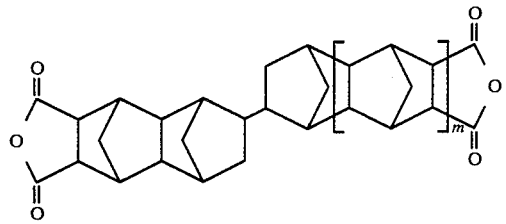

wherein m is a positive integer, and
(C) 0.1 to 5.0 parts by weight of a cure accelerator selected from the group consisting of tertiary amines, imidazole compounds, metal compounds, amide compounds, acid anhydrides, peroxides, phenolic resins, azo compounds, cyanata compounds, isocyanate compounds and quaternary ammonium salts.

3. An epoxy resin based powder coating composition as in claim 2 further comprising an aromatic acid anhydride based curing agent in an amount of ranging from 0.5 to 1.2 times the theoretical value of the equivalent weight of the acid anhydride with resepct to the epoxy equivalent weight of said epoxy resin.

4. An epoxy resin based powder coating composition as in claim 3, wherein said aromatic acid anhydride based curing agent is 3,3,4,4'-benzophenone tetracarboxylic dianhydride or 5-(2,5-dioxotetrahydrofuryl)-3-methyl-3-cyclohexene-1,2-dicarboxylic acid anhydride.

5. An epoxy resin based powder coating composition as in claim 2, further comprising 1.0 to 3.0 parts by weight of an acrylonitrile-butadiene copolymer and 0.1 to 0.5 part by weight of an acrylic acid ester oligomer.

6. An epoxy resin based powder coating composition as in claim 2, further comprising calcium silicate or calcium carbonate.

* * * * *